United States Patent
Basov et al.

(10) Patent No.: US 11,347,423 B2
(45) Date of Patent: May 31, 2022

(54) SYSTEM AND METHOD FOR DETECTING DEDUPLICATION OPPORTUNITIES

(71) Applicant: EMC IP Holding Company, LLC, Hopkinton, MA (US)

(72) Inventors: Ivan Basov, Brookline, MA (US); Sorin Faibish, Newton, MA (US); Istvan Gonczi, Berkley, MA (US)

(73) Assignee: EMC IP HOLDING COMPANY, LLC, Hopkinton, MA (US)

(*) Notice: Subject to any disclaimer, the term of this patent is extended or adjusted under 35 U.S.C. 154(b) by 374 days.

(21) Appl. No.: 16/525,192

(22) Filed: Jul. 29, 2019

(65) Prior Publication Data

US 2021/0034262 A1 Feb. 4, 2021

(51) Int. Cl.
*G06F 16/00* (2019.01)
*G06F 3/06* (2006.01)
*G06F 17/18* (2006.01)

(52) U.S. Cl.
CPC .......... *G06F 3/0641* (2013.01); *G06F 3/061* (2013.01); *G06F 3/0608* (2013.01); *G06F 3/0689* (2013.01); *G06F 17/18* (2013.01)

(58) Field of Classification Search
CPC ................................................. G06F 16/744
USPC ..................................................... 707/692
See application file for complete search history.

(56) References Cited

U.S. PATENT DOCUMENTS

| 10,664,165 | B1* | 5/2020 | Faibish | G06F 3/0689 |
| 10,789,062 | B1* | 9/2020 | Suryanarayana | G06F 3/0641 |
| 2020/0341669 | A1* | 10/2020 | Shabi | G06F 3/0641 |

* cited by examiner

*Primary Examiner* — Baoquoc N To
(74) *Attorney, Agent, or Firm* — Brian J. Colandreo; Mark H. Whittenberger; Holland & Knight LLP

(57) ABSTRACT

A method, computer program product, and computer system for identifying a plurality of blocks. At least one heuristic associated with at least a portion of the plurality of blocks may be determined. It may be determined whether at least the portion of the plurality of blocks is a candidate for deduplication based upon, at least in part, the at least one heuristic. At least the portion of the plurality of blocks may be deduplicated based upon, at least in part, the at least one heuristic.

17 Claims, 5 Drawing Sheets

SYSTEM AND METHOD FOR DETECTING DEDUPLICATION OPPORTUNITIES

BACKGROUND

Some systems may use variable deduplication in fixed block storage arrays with sector level deduplication for fixed blocks. Although the method may have increased dramatically the dedupe data reduction, it may require additional resources (e.g., memory and CPU) and as a result impacts the IOs per second (IOPS) performance of the array.

BRIEF SUMMARY OF DISCLOSURE

In one example implementation, a method, performed by one or more computing devices, may include but is not limited to identifying a plurality of blocks. At least one heuristic associated with at least a portion of the plurality of blocks may be determined. It may be determined whether at least the portion of the plurality of blocks is a candidate for deduplication based upon, at least in part, the at least one heuristic. At least the portion of the plurality of blocks may be deduplicated based upon, at least in part, the at least one heuristic.

One or more of the following example features may be included. The at least one heuristic may include a distance function associated with at least the portion of the plurality of blocks. The at least one heuristic may include a digital entropy value associated with at least the portion of the plurality of blocks resulting from the distance function. The distance function may include alphabet encoding. Additional data comparison on the candidate may be performed prior to deduplication. At least the portion of the plurality of blocks may be the candidate for deduplication when the digital entropy value associated with at least the portion of the plurality of blocks resulting from the distance function is less than a threshold. At least the portion of the plurality of blocks may not be the candidate for deduplication when the digital entropy value associated with at least the portion of the plurality of blocks resulting from the distance function is more than a threshold.

In another example implementation, a computing system may include one or more processors and one or more memories configured to perform operations that may include but are not limited to identifying a plurality of blocks. At least one heuristic associated with at least a portion of the plurality of blocks may be determined. It may be determined whether at least the portion of the plurality of blocks is a candidate for deduplication based upon, at least in part, the at least one heuristic. At least the portion of the plurality of blocks may be deduplicated based upon, at least in part, the at least one heuristic.

One or more of the following example features may be included. The at least one heuristic may include a distance function associated with at least the portion of the plurality of blocks. The at least one heuristic may include a digital entropy value associated with at least the portion of the plurality of blocks resulting from the distance function. The distance function may include alphabet encoding. Additional data comparison on the candidate may be performed prior to deduplication. At least the portion of the plurality of blocks may be the candidate for deduplication when the digital entropy value associated with at least the portion of the plurality of blocks resulting from the distance function is less than a threshold. At least the portion of the plurality of blocks may not be the candidate for deduplication when the digital entropy value associated with at least the portion of the plurality of blocks resulting from the distance function is more than a threshold.

In another example implementation, a computer program product may reside on a computer readable storage medium having a plurality of instructions stored thereon which, when executed across one or more processors, may cause at least a portion of the one or more processors to perform operations that may include but are not limited to identifying a plurality of blocks. At least one heuristic associated with at least a portion of the plurality of blocks may be determined. It may be determined whether at least the portion of the plurality of blocks is a candidate for deduplication based upon, at least in part, the at least one heuristic. At least the portion of the plurality of blocks may be deduplicated based upon, at least in part, the at least one heuristic.

One or more of the following example features may be included. The at least one heuristic may include a distance function associated with at least the portion of the plurality of blocks. The at least one heuristic may include a digital entropy value associated with at least the portion of the plurality of blocks resulting from the distance function. The distance function may include alphabet encoding. Additional data comparison on the candidate may be performed prior to deduplication. At least the portion of the plurality of blocks may be the candidate for deduplication when the digital entropy value associated with at least the portion of the plurality of blocks resulting from the distance function is less than a threshold. At least the portion of the plurality of blocks may not be the candidate for deduplication when the digital entropy value associated with at least the portion of the plurality of blocks resulting from the distance function is more than a threshold.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
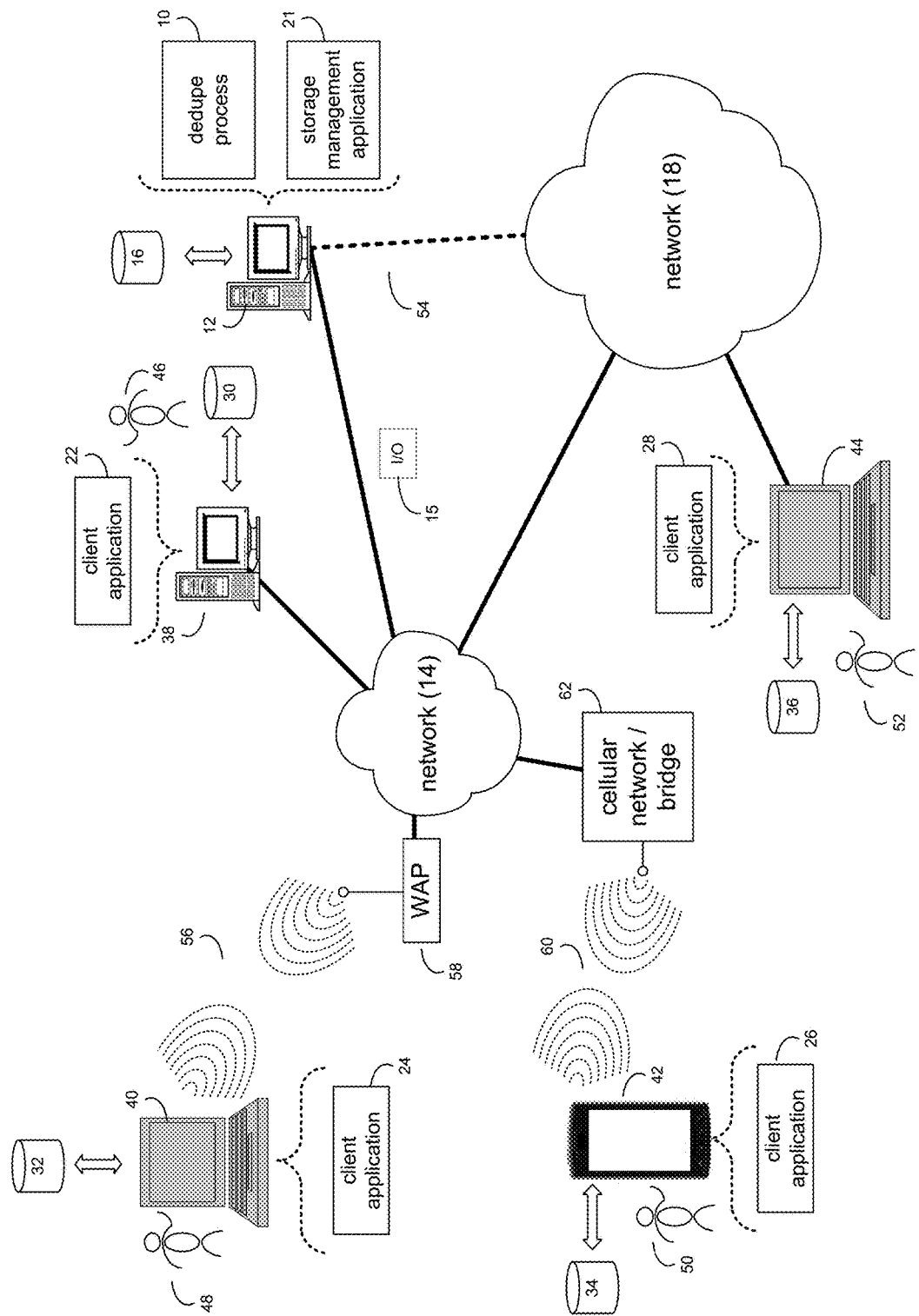
FIG. 1 is an example diagrammatic view of a dedupe process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, macqhine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown dedupe process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a dedupe process, such as dedupe process 10 of FIG. 1, may identify a plurality of blocks. At least one heuristic associated with at least a portion of the plurality of blocks may be determined. It may be determined whether at least the portion of the plurality of blocks is a candidate for deduplication based upon, at least in part, the at least one heuristic. At least the portion of the plurality of blocks may be deduplicated based upon, at least in part, the at least one heuristic.

In some implementations, the instruction sets and subroutines of dedupe process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, dedupe process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, dedupe process 10 and/or storage management application 21 may be accessed via one or more of client applications 22, 24, 26, 28. In some implementations, dedupe process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within dedupe process 10, a component of dedupe process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of dedupe process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of dedupe process 10 (and vice versa). Accordingly, in some implementations, dedupe process 10 may be a purely server-side application, a purely client-side application, or a hybrid server-side/client-side application that is cooperatively executed by one or more of client applications 22, 24, 26, 28 and/or dedupe process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, dedupe process 10, and storage management application 21, taken singly or in any combination, may effectuate some or all of the same functionality, any description of effectuating such functionality via one or more of client applications 22, 24, 26, 28, dedupe process 10, storage management application 21, or combination thereof, and any described interaction(s) between one or more of client applications 22, 24, 26, 28, dedupe process 10, storage management application 21, or combination thereof to effectuate such functionality, should be taken as an example only and not to limit the scope of the disclosure.

In some implementations, one or more of users 46, 48, 50, 52 may access computer 12 and dedupe process 10 (e.g., using one or more of client electronic devices 38, 40, 42, 44) directly through network 14 or through secondary network 18. Further, computer 12 may be connected to network 14 through secondary network 18, as illustrated with phantom link line 54. Dedupe process 10 may include one or more user interfaces, such as browsers and textual or graphical user interfaces, through which users 46, 48, 50, 52 may access dedupe process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
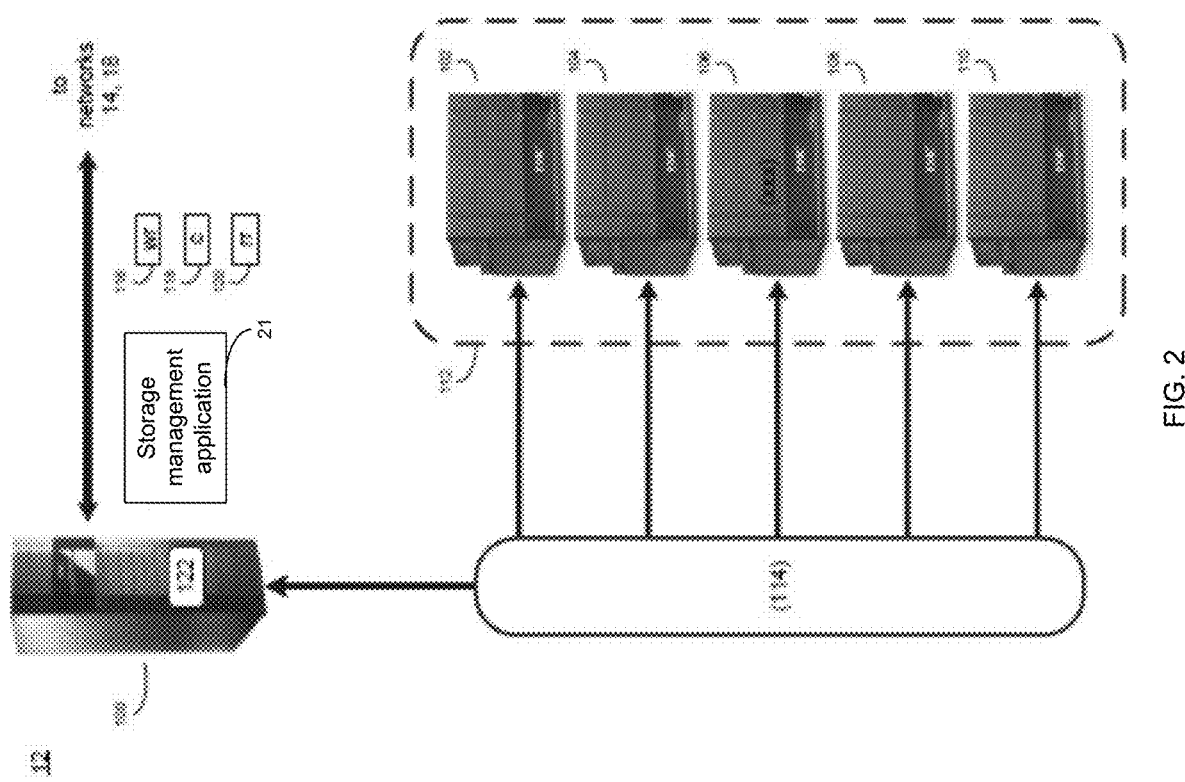
FIG. 2 is an example diagrammatic view of a storage system of FIG. 1 according to one or more example implementations of the disclosure.
Figure 3:
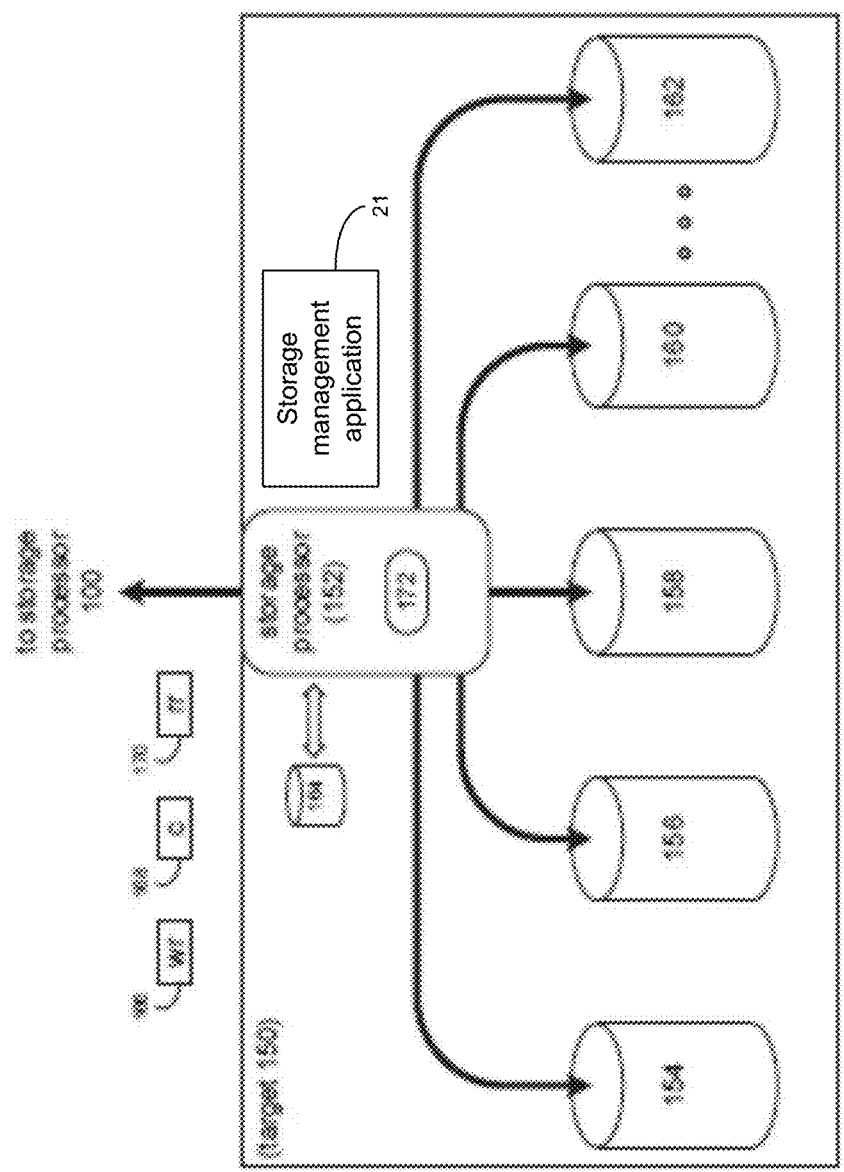
FIG. 3 is an example diagrammatic view of a storage target of FIG. 1 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™, VNX™, or Unity™ system offered by Dell EMC™ of Hopkinton, Mass.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or dedupe process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VPLEX™, VNX™, or Unity™ system offered by Dell EMC™ of Hopkinton, Mass. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

Some systems may use variable deduplication in fixed block storage arrays with sector level deduplication for fixed blocks. Although the method may have increased dramatically the dedupe data reduction, it may require additional resources (e.g., memory and CPU) and as a result impacts the IOs per second (IOPS) performance of the array. One of the potential reasons for this may be that there may be a need to calculate partial hashes for all the sectors of the, e.g., 4k block and store the hashes of the sectors in memory database for longer time if there were no duplicates found. Using non-cryptographic hashes may increase the probability of collisions, but it has an advantage in detecting small differences between slightly different 4k data blocks. So, using this factor, the probability of collision with that block may be calculated and blocks that are different may be found in a small number of bytes/bits.

Therefore, as will be discussed below, the present disclosure may introduce a new distance function that allows "very similar" blocks to be found with minimal hash distance between them. Using this distance function, the present disclosure may evaluate the potential of duplicate sectors between the similar blocks and decide to look for partial blocks deduplication based on the new distance function value. In this way, the present disclosure may prevent wasting CPU and memory resources computing the sectors hashes inside the 4k if the distance between the blocks is too large. Moreover, the present disclosure may then use byte compare to validate the hash and prevent collision the same byte compare mechanism is used to evaluate the distance between 2 block candidates for deduplication.

Figure 4:
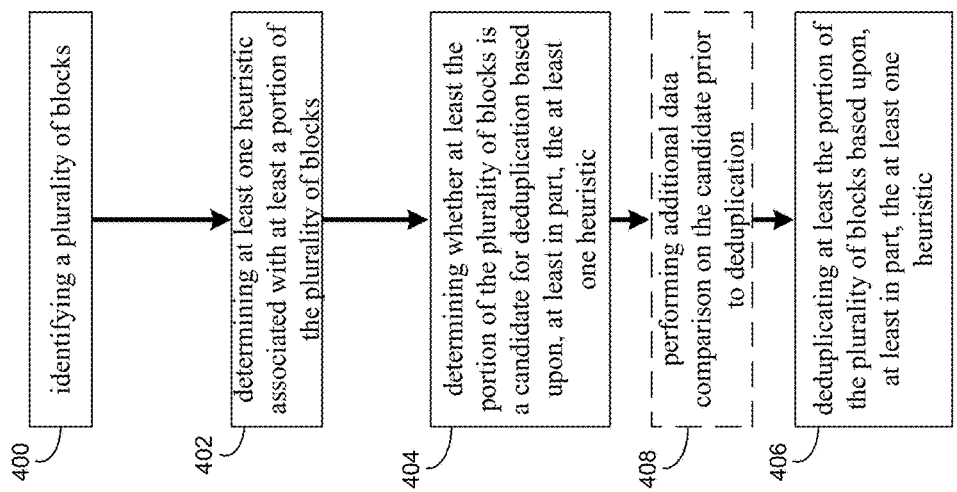
FIG. 4 is an example flowchart of a dedupe process according to one or more example implementations of the disclosure.
Figure 5:
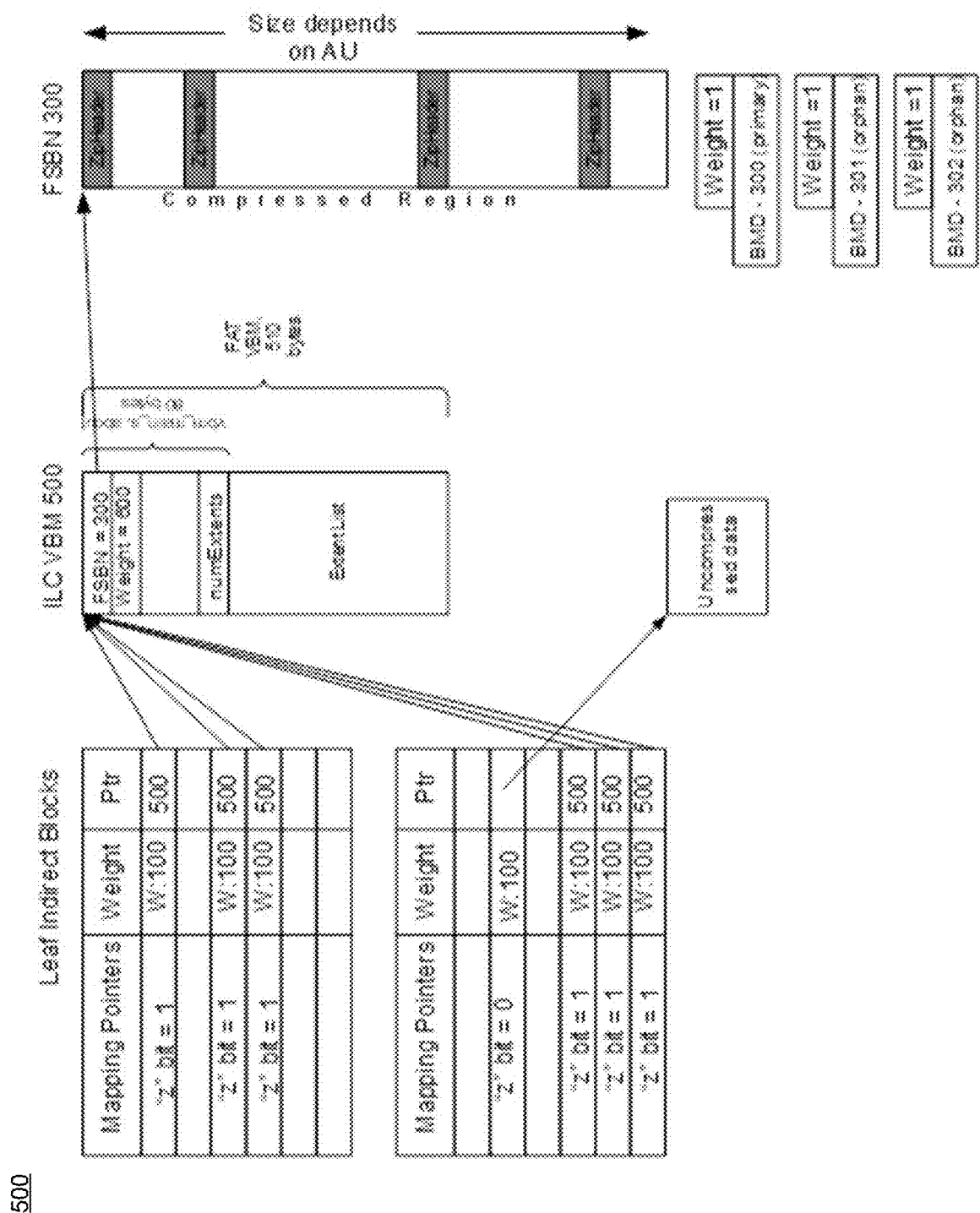
FIG. 5 is an example diagrammatic view of a basic mapping structure according to one or more example implementations of the disclosure.

The Dedupe Process:

As discussed above and referring also at least to the example implementations of FIGS. 4-5, dedupe process 10 may identify 400 a plurality of blocks. Dedupe process 10 may determine 402 at least one heuristic associated with at least a portion of the plurality of blocks. Dedupe process 10 may determine 404 whether at least the portion of the plurality of blocks is a candidate for deduplication based upon, at least in part, the at least one heuristic. Dedupe process 10 may deduplicate 406 at least the portion of the plurality of blocks based upon, at least in part, the at least one heuristic.

In some implementations, dedupe process 10 may identify 400 a plurality of blocks. For instance, and referring at least to the example implementation of FIG. 5, an example basic mapping structure 500 diagram shows a set of blocks, as will be discussed below, may be identified and selected by dedupe process 10 for deduplication. It will be appreciated that while a particular mapping structure is shown for a particular storage system example, other storage system designs and implementations may be used without departing from the scope of the present disclosure. As such, the use of basic mapping structure 500 or any particular storage system should be taken as example only and not to otherwise limit the scope of the disclosure.

In the example, for compressed data, the data FSBN in the VBM may point to a compressed region, which often may be, e.g., 64K in size, but may vary depending on block allocation, and if compressed regions have been subject to evacuation (e.g., FS-R, SpaceMaker, etc.). Currently, for example purposes only, each extent represents individual compressed AU, preceding by ZipHeader.

In some implementations, dedupe process 10 may determine 402 at least one heuristic associated with at least a portion of the plurality of blocks, where the at least one heuristic may include a distance function (e.g., alphabet encoding) associated with at least the portion of the plurality of blocks, and where the at least one heuristic may include a digital entropy value associated with at least the portion of the plurality of blocks resulting from the distance function. For example, in variable block size deduplication, the potential smaller sub-blocks inside fixed size block duplicates may be missed, or hashes of the sectors of the 4k blocks are computed and no matches are found. As will be discussed below, dedupe process 10 may reduce the amount of wasted resources used to compute sector hashes and store them in memory by calculating a distance function between the hashes of two dedupe candidate 4k blocks, and if the distance is bigger than a given threshold, dedupe process 10 may not utilize resources trying to look for partial block dedupes inside that 4k block, and if the distance is smaller than a given threshold, dedupe process 10 may then utilize resources trying to look for partial block dedupes inside that 4k block. In some implementations, dedupe process 10 may use hashes that may allow defining a strong homeomorphic monotonic distance function that may be able to detect similarities between the hashes of the candidate 4k blocks. This may be a performance optimization method that may achieve maximum DRR and may improve the IOPS performance of storage arrays.

In some implementations, dedupe process 10 may determine 404 whether at least the portion of the plurality of blocks is a candidate for deduplication based upon, at least in part, the at least one heuristic. For example, at least the portion of the plurality of blocks may be the candidate for deduplication when the digital entropy value associated with at least the portion of the plurality of blocks resulting from the distance function is less than a threshold, and at least the portion of the plurality of blocks may not be the candidate for deduplication when the digital entropy value associated with at least the portion of the plurality of blocks resulting from the distance function is more than the threshold. For example, as will be discussed in greater detail below, alphabet encoding may relate to the data compression algorithms from LZ family. The method used by LZ may be based on detection of identical bit strings within the data block chunk compressed included in a dictionary specific to the data chunk. The letters in the dictionary may be defined as sequences of bits or strings with lengths 1,2, . . . , n. The algorithm may then use a fixed size window to find the string sequences, letters, location and frequency inside the moving window. As the same dictionary may be defined for different data chunks using the dictionary to encode the bits, the frequency and the location of the sequences may be prone to "confusion" as two different chunks may have the same sequences, yet they are different in frequency and letters' locations in the chunk. Nevertheless, if certain sequences of letters are found in the chunk, there is a high probability that the entire segments could be similar. And as the entropy estimates these frequencies, dedupe process 10 may propose to use the entropy as a distance function between two dictionaries encoding two different chunks. That is, dedupe process 10 may use the dictionary as an encoding function similar to a hash function.

To measure the "distance" between two data chunks, there may be a distance function (noted above) and a hash that preserves the distance property between data chunks such that the distance between the hashes of the two chunks may correspond to the distance between the bits of the two chunks. In some implementations, random polynomials may be used to create flexible and robust fingerprints for binary data that may be the measuring distance between strings.

This distance function between the chunks and the hashes may preserve the relation between two pairs of chunks with similar content to each other. For example, assume two chunks/blocks with bit contents b1 and b2 that we want to compare for similarities by measuring the distance between them D(b1,b2). Dedupe process 10 may define a hash function H that preserve the distance relation between D(b1,b2) and D(H(b1),H(b2)). The distance function between two data chunks and the distance function used for the two hashes could be different and still preserve the relation between hashes and data chunks. For example, dedupe process 10 may use an edit distance function on the data blocks themselves and a L2 distance on the hashes to achieve the desired effect. For example:

Lemma 1:

If (b1,b2,b3) are three chunks of the same size and D12 and D13 are the corresponding distances of each pair:

D12=D(b1,b2) and D13=D(b1,b3)

We define a distance preserving hash function H and hash all three chunks such that h1=H(b1); h2=H(b2); h3=H(b3) and d12=D(h1,h2) and d13=D(h1,h3), then if d12<d13 then D12<D13

Lemma 2:

With the above definitions (used for example purposes only) if dedupe process 10 defines a similarity threshold Th for the chunks and a similarity threshold th for the hashes, then if d1<th then D1<Th. As a result, dedupe process 10 may infer that the distance function preserves the distance relations between the blocks and the hashes of the blocks.

It will be appreciated that various different hash distance functions, both Euclidean and non-Euclidean candidates, may be used with distance of similarity functions. Assume for example purposes only that all the distance functions D discussed are a measure of the bits similarities between two chunks/hashes according to:

Axiom 3: D is a distance measure if it is a function from pairs of data chunks to real numbers such that:

1. D (x,y)>0.
2. D (x,y)=0 iff x=y.
3. D (x,y)=D (y,x).
4. D (x,y)<D (x,z)+D (z,y) (triangle inequality).

The candidate distant functions may be Euclidean or not, but may preserve the distance relation of the chunks and the hashes. The following is a discussion of the following example and non-limiting distance functions candidates:

Euclidean, e.g.: L2 norm, L1 norm, Ln norm

Non-Euclidean, e.g.: Jaccard distance; Cosine distance; Edit distance; Hamming Distance; Levenshtein distance; sketches and Entropy distance.

As noted above, the distance function may include alphabet encoding, which may be based on analysis of two string of "letters"/characters and detection of permutations and or sequences of letters deleted and inserted between the two strings. Data reduction may be improved as a second step after the compression and use "edit" distance to compare two hashes represented by strings of the "letters" used for compression dictionary for each block. This distance function may detect deletion and/or insertion of character in a string representing the chunk compressed using, e.g., LZ algorithms. For example, the following compressed form of 150 bits is represented by the following string:

TOBEORNOTTOBEORTOBEORNOT compressed to 3TO3BE3OR2NOT for 2:1 compression.

The target string will be:

NOTTOBEORTOBEORTOBEFORTO. The identical string lists are: TO, BE, OR, NOT so if the sequences are deduplicated the new string may be reduced to F as the other string chains are all in the initial block. This distance measures the insertions or deletion of strings.

The edit distance computation example is as follows:

Find the first string "TOBE" in the source chunk.

Count the number of max number of characters before the same string is found in the target, e.g.: Numeral (NOTTOBEORTOBEOR)=15;

Lookup for next string "OR" in the source and find first occurrence in the target Numeral(NOTTOBE)=6;

Repeat the above for the string NOTTOBEORTOBEOR which is found on first string in the target the distance is 1.

The different strings are NOT in source and F in the target; for NOT 3 may be subtracted (number of chars=length of NOT) and for F 5 may be subtracted (end to location of F).

The result is 15+6+1−3−5=14.

The "edit" distance between these two strings will thus be 14. An example and non-limiting minDist threshold of 20 may be introduced so the distance between the two strings is 14<20 meaning that the 2 strings can be considered similar.

In some implementations, dedupe process 10 may deduplicate 406 at least the portion of the plurality of blocks based upon, at least in part, the at least one heuristic. For example, when an IO is written to the storage system it may be cached in a buffer which is the candidate for partial dedupe. Dedupe process 10 may look up in the cache and identify a target candidate block shared sector mapping, and a deduplication focused on block similarity assessment based on the above. The example purpose of sector remapping may be to take a partial dedupe target block and supply any matching 512 bytes sectors from it as a partial dedupe candidate, where some sectors may be identical between the candidate and the target. By "supply" it is meant copy. When a partial dedupe opportunity is identified, it may be discovered that there is some shared data between a dedupe target and a dedupe candidate. To identify the shared data sections, dedupe process 10 may record where in the target and in the candidate this shared data is located.

The shared data may be provided (i.e., to "fill in", or copy the shared data regions) from the target to the candidate block, and dedupe process 10 may record the offset and length of the shared data segment in both the target and the candidate. The data that drives the above described block transformation is what is called.

Regarding Shared Sector Mapping (SSM), the naive SSM may be based on identifying contiguous sets of dedupe-able sectors, and tracking the length(s) and offset(s) of these in the candidate, and in the target. The decision to perform or not partial deduplication operation may be based on the DRR (data reduction rate) between the candidate and one or more target blocks resident in the buffer cache. A more flexible/optimized sector granularity SSM approach will now be discussed. Dedupe process 10 may use an array of sector positions, where the location of a matching sector in the candidate is implied by the array position. That is: index zero of the array described where the first sector of the candidate comes from. Index 1 describes which position the 2nd sector of the candidate comes from, etc.

The array index implies which sector being talked about in the candidate. The array content is the index of the "matching" sector in the partial dedupe target that provides the data. The array cell content, e.g., 0xFF, may be reserved to indicate "no match". For example, this SSM may allow a single sector from the target to be mapped into multiple sectors of the candidate. If the sector bytes content is denoted as A, B, C, X (X indicating random non-matching sector content) it may be possible to map a target AXXXXXXX and candidate AAAAAAAA. A strict sector by sector vector comparison of the sector hashes would not likely account for the total savings possible. Above, the entire candidate may be constructed from the target. This may not be apparent from an ordered, sector-by-sector comparison. Several examples may be presented and discussed below.

Example 1: The above AXXXXXXX→AAAAAAAA would be encoded as a remap vector of: 0,0,0,0,0,0,0,0. This says that all blocks in the candidate are identical to the sector 0 of the target.

Example 2: AXXXXXXX→AAAAAAAX would be encoded as a remap vector of: 0,0,0,0,0,0,0,0xFF. The only difference between the 2 examples is that the candidate now has a unique (non-dedupe-able) last sector, indicated by the reserved index code 0xFF.

Example 3: Let A, B, C etc. indicate sectors with unique content, or unique sector hashes and X denote random, non-matching content such as: Target ABCDEFGB→ (mapped to) Candidate: AABBGGXX.

Dedupe process 10 may remap the array index of 4-byte location index in candidate. The position in the array implies the position of the sector in the target. The content indicates the position in the candidate position in the dedupe target (implied by location in the map array). The cell content is the position in the candidate. 0xFF is a special value indicating "no match". For this case, the following mapping table I may be:

| Mapping Table I | | |
|---|---|---|
| Candidate | Target | Comments |
| 0 | 0 | // Sector zero of the target is A, and it is found in the candidate's sector 0 |
| 1 | 0 | // Sector 1 of the candidate is also A and it is also coming from the target's sector 0 |
| 2 | 7 | // etc. |
| 3 | 7 | // etc.. |
| 4 | 6 | |
| 5 | 6 | |
| 6 | 0xFF | // Sector 6 and 7 of the candidate have no match in the target |
| 7 | 0xFF | |

To identify matches between any possible sector pairs, a permuted set of hash comparisons may be calculated. This is O(n2), but n is small, and these are only hash comparisons. Given the above SSM, the similarity metric/distance between 2 buffers may be defined as the number of non-0xFF values in the remapping vector similar to edit distance. If it is decided to perform a partial dedupe, sector hash matches still may need to be verified by data compare, but elimination of low-similarity target/candidate pairs may be done based on the hash comparison only. In a small number of cases, there may be a false positive decision, which may be later abandoned when the data mis-compare is discovered. If there is a single dedupe target, it may be decided to go ahead (or not) with the partial dedupe operation for the above defined similarity computation.

In the above example, dedupe process 10 has located 2 (or more) partial dedupe targets, a simpler and slightly different similarity method may be used. If the 2 or more targets provide all the sectors of the candidate, dedupe process 10 may perform the partial dedupe, regardless of the individual similarity of either of the 2 target blocks. This may be because in this case, all blocks are provided by the partial dedupe targets, and not having to compress and write the "unique" leftover data is a significant win, because, in this case there is no unique leftover data. The above "win" will be realized even if one of the targets only provides a single partial dedupe block, while the other one provides the other 7.

A partial deduplication decision based on SSM similarity will now be shown below:

Dedupe Decision:

(i) Single target: dedupe if similarity metric>2.

(ii) 2 targets: if the 2 targets provide all blocks of the candidate, dedupe using both targets.

(iii) 2 targets, but they do not provide all blocks of the candidate: Dedupe but only one target. Use (i) to pick it. If similarity metric is the same for both, pick one randomly.

Full block dedupe: there is nothing to write to the Physical Large Block (PLB), so there is nothing to compress.

Compression Decision:

If partial dedupe is performed, dedupe process 10 may compress the block. This is because compression is part of the scheme to realize any partial deduplication savings as any partially deduped regions are zeroed out, and there is at least 3 sectors of these as per the minimum partial dedupe savings mandated above. If there were no deduplication, then a compression decision should be made. This can be done based on entropy. The purpose is to perform the data reduction operation with maximum efficiency: if compression gives more data reduction than partial dedupe, dedupe process 10 may only compress.

A decision may be made by dedupe process 10 whether to perform compression, deduplication, both, or neither. For example, in a traditional storage system employing fixed block level deduplication, the deduplication and compression are 2 independently related operations. Deduplication operations may be performed on data chunk match, regardless of how compressible that data chunk is. It would be desirable to know early on, before doing the data reduction, if a block is "extremely compressible" and exclude such blocks from partial or full deduplication. This is because deduplication incur some per-block overhead (e.g., extra data, extra metadata, extra IO). If the deduplication's data and metadata overhead is comparable to the compressed data written to the backend, it may be advantageous to forgo deduplication. For this reason, it would be desirable to find an inexpensive computation algorithm to estimate if the block data is highly compressible.

Dedupe process 10 may perform 408 additional data comparison on the candidate prior to deduplication. For example, per-block entropy calculation may be leveraged for such an estimate. Once the entropy is calculated, it may also have some utility in analyzing dedupe-ability of the data, given the similarity metric. Sector entropy may be used to speed up the determination of sector data content equality. If 2 sector's entropy values are different, we know for certain that the block data is also different. Since entropy is not a proper hash, the false positive match rate may be higher than a per-sector hash would have. For this reason, an entropy match may need to be followed up by performing a data comparison between the sectors. Collisions are considered rare enough, for the entropy values to be useful as inexpensive hashes. (The cost is close to zero, as they have been calculated already for a different purpose, i.e., estimating compressibility). The similarity metric may be calculated, regardless of how the comparison function is implemented to compare the elements of the alphabet.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   identifying a plurality of blocks;
   determining at least one heuristic associated with at least a portion of the plurality of blocks;
   determining whether at least the portion of the plurality of blocks is a candidate for deduplication based upon, at least in part, the at least one heuristic;
   performing additional data comparison on the candidate prior to deduplication to determine if the candidate for deduplication has duplicate data; and
   deduplicating at least the portion of the plurality of blocks based upon, at least in part, the at least one heuristic and the additional data comparison.

2. The computer-implemented method of claim 1 wherein the at least one heuristic includes a distance function associated with at least the portion of the plurality of blocks.

3. The computer-implemented method of claim 2 wherein the at least one heuristic includes a digital entropy value associated with at least the portion of the plurality of blocks resulting from the distance function.

4. The computer-implemented method of claim 2 wherein the distance function includes alphabet encoding.

5. The computer-implemented method of claim 3 wherein at least the portion of the plurality of blocks is the candidate for deduplication when the digital entropy value associated with at least the portion of the plurality of blocks resulting from the distance function is less than a threshold.

6. The computer-implemented method of claim 3 wherein at least the portion of the plurality of blocks is not the candidate for deduplication when the digital entropy value associated with at least the portion of the plurality of blocks resulting from the distance function is more than a threshold.

7. A computer program product residing on a non-transitory computer readable storage medium having a plurality of instructions stored thereon which, when executed across one or more processors, causes at least a portion of the one or more processors to perform operations comprising:
   identifying a plurality of blocks;
   determining at least one heuristic associated with at least a portion of the plurality of blocks;
   determining whether at least the portion of the plurality of blocks is a candidate for deduplication based upon, at least in part, the at least one heuristic;
   performing additional data comparison on the candidate prior to deduplication to determine if the candidate for deduplication has duplicate data; and
   deduplicating at least the portion of the plurality of blocks based upon, at least in part, the at least one heuristic and the additional data comparison.

8. The computer program product of claim 7 wherein the at least one heuristic includes a distance function associated with at least the portion of the plurality of blocks.

9. The computer program product of claim 8 wherein the at least one heuristic includes a digital entropy value associated with at least the portion of the plurality of blocks resulting from the distance function.

10. The computer program product of claim 8 wherein the distance function includes alphabet encoding.

11. The computer program product of claim 9 wherein at least the portion of the plurality of blocks is the candidate for deduplication when the digital entropy value associated with at least the portion of the plurality of blocks resulting from the distance function is less than a threshold.

12. The computer program product of claim 9 wherein at least the portion of the plurality of blocks is not the candidate for deduplication when the digital entropy value associated with at least the portion of the plurality of blocks resulting from the distance function is more than a threshold.

13. A computing system including one or more processors and one or more memories configured to perform operations comprising:
   identifying a plurality of blocks;
   determining at least one heuristic associated with at least a portion of the plurality of blocks;
   determining whether at least the portion of the plurality of blocks is a candidate for deduplication based upon, at least in part, the at least one heuristic;
   performing additional data comparison on the candidate prior to deduplication to determine if the candidate for deduplication has duplicate data; and
   deduplicating at least the portion of the plurality of blocks based upon, at least in part, the at least one heuristic and the additional data comparison.

14. The computing system of claim 13 wherein the at least one heuristic includes a distance function associated with at least the portion of the plurality of blocks.

15. The computing system of claim 14 wherein the at least one heuristic includes a digital entropy value associated with at least the portion of the plurality of blocks resulting from the distance function.

16. The computing system of claim 15 wherein at least the portion of the plurality of blocks is the candidate for deduplication when the digital entropy value associated with at least the portion of the plurality of blocks resulting from the distance function is less than a threshold, and wherein at least the portion of the plurality of blocks is not the candidate for deduplication when the digital entropy value associated with at least the portion of the plurality of blocks resulting from the distance function is more than the threshold.

17. The computing system of claim 14 wherein the distance function includes alphabet encoding.

* * * * *